United States Patent
Jasionowski et al.

(10) Patent No.: US 11,321,162 B2
(45) Date of Patent: May 3, 2022

(54) INCIDENT ROOT CAUSE ANALYSIS USING GALOIS CONNECTIONS

(71) Applicant: Kyndryl, Inc., New York, NY (US)

(72) Inventors: Pawel Jasionowski, Wroclaw (PL); Daniel S. Riley, Wake Forest, NC (US); Steven J. Mazzuca, New Paltz, NY (US); Michael H. Roehl, New Fairfield, CT (US); George E. Stark, Lakeway, TX (US)

(73) Assignee: KYNDRYL, INC., New York, NY (US)

( * ) Notice: Subject to any disclaimer, the term of this patent is extended or adjusted under 35 U.S.C. 154(b) by 91 days.

(21) Appl. No.: 16/822,868

(22) Filed: Mar. 18, 2020

(65) Prior Publication Data

US 2021/0294681 A1 Sep. 23, 2021

(51) Int. Cl.
*G06F 11/00* (2006.01)
*G06F 11/07* (2006.01)
*G06N 7/00* (2006.01)
*G06N 20/00* (2019.01)

(52) U.S. Cl.
CPC ........ *G06F 11/079* (2013.01); *G06F 11/0709* (2013.01); *G06F 11/0751* (2013.01); *G06F 11/0793* (2013.01); *G06N 7/005* (2013.01); *G06N 20/00* (2019.01)

(58) Field of Classification Search
CPC .............. G06F 11/079; G06F 11/0709; G06F 11/0751; G06F 11/0793; G06N 20/00
See application file for complete search history.

(56) References Cited

U.S. PATENT DOCUMENTS

| | | | |
|---|---|---|---|
| 9,229,899 B1 * | 1/2016 | Mankovski | G06F 9/542 |
| 9,317,829 B2 | 4/2016 | Anand et al. | |
| 10,445,170 B1 * | 10/2019 | Subramanian | G06N 7/005 |
| 2006/0112135 A1 * | 5/2006 | Warshawsky | G06F 11/3452 |
| 2007/0294406 A1 | 12/2007 | Suer et al. | |

(Continued)

OTHER PUBLICATIONS

Zogragos et al., "A real-time decision support system for roadway network incident response logistics", Transportation Research Part C 10 (2002) 1-18, Jun. 26, 2000.

(Continued)

*Primary Examiner* — Jonathan D Gibson
(74) *Attorney, Agent, or Firm* — Garg Law Firm, PLLC; Rakesh Garg; Erik Swanson

(57) ABSTRACT

A method of identifying an incident root cause probability that includes identifying, using a monitoring system, a first incident/incident class and generating, using a change management application, a first change request and change class. The method also includes generating, from the change management application, a second change request from a second incident, and where the first and second incidents are in a set of incidents, and where the first and second change requests are in a set of changes, mapping, by a cause analysis application, the set of incidents to the set of changes to identify a root cause probability, where the probability is formed by from a Galois linkage chain between the two sets, and developing, from the cause analysis application, a root cause probability value of the first incident, and executing, using a parameter management application, a mitigation process.

20 Claims, 6 Drawing Sheets

(56) References Cited

U.S. PATENT DOCUMENTS

| | | | |
|---|---|---|---|
| 2013/0297976 A1* | 11/2013 | McMillen | H04L 43/10 |
| | | | 714/43 |
| 2014/0129536 A1* | 5/2014 | Anand | G06N 7/005 |
| | | | 707/706 |
| 2014/0136260 A1 | 5/2014 | Dasgupta et al. | |
| 2014/0244333 A1 | 8/2014 | Bournas | |
| 2015/0262106 A1 | 9/2015 | Diao et al. | |
| 2015/0317567 A1* | 11/2015 | Lin | G06Q 10/00 |
| | | | 705/7.11 |
| 2016/0246662 A1* | 8/2016 | Meng | G06F 11/0787 |
| 2017/0091463 A1* | 3/2017 | Lindteigen | H04L 9/0816 |
| 2017/0178038 A1* | 6/2017 | Guven | G06Q 30/016 |
| 2017/0213142 A1* | 7/2017 | Kaluza | G06F 11/079 |
| 2018/0137415 A1* | 5/2018 | Steinberg | G06N 20/00 |
| 2018/0196707 A1* | 7/2018 | Gaha Tchamabe | G06F 11/079 |
| 2019/0132191 A1 | 5/2019 | Mann et al. | |
| 2019/0354991 A1* | 11/2019 | Sosale | G06Q 30/016 |
| 2020/0327005 A1* | 10/2020 | Singh | G06F 11/0793 |
| 2021/0089377 A1* | 3/2021 | Wang | G06F 11/0775 |
| 2021/0103840 A1* | 4/2021 | Kwong | G06N 7/005 |

OTHER PUBLICATIONS

Peng et al., "An incident information management framework based on data integration, data mining, and multicriteria-decision making", Decision Support Systems 51 (2011), 316-327.

Güven et al., "COACH: Cognitive Analytics for Change", pp. 1-6.

* cited by examiner

*FIGURE 3*

| METHOD STRUCTURE 300 | | |
|---|---|---|
| INPUT (X) | OUTPUT (Y) | APPLICATION |
| INCIDENT INC123, INCIDENT INC236  302 | ROOT CAUSE OF THE INCIDENT  304 | BASED ON ROOT CAUSE ANALYSIS; SEEK TO REDUCE THE NUMBER OF FUTURE INCIDENTS  306 | ns or after change events. Incidents can often cause
INCIDENT ROOT CAUSE ANALYSIS USING GALOIS CONNECTIONS

BACKGROUND

The present invention relates generally to a method, computer program product, and system to identify root causes of incidents. More particularly, the present invention relates to a method, computer program product, and system for root cause analysis of incidents using monotonic Galois cause and effect linkage chains.

In an IT environment, an incident is any unexpected occurrence when using a system. In many embodiments, an incident report is generated by the system whenever an incident takes place. As an example, a user connected to the Internet attempts to access an invalid website and receives a 404 error. An incident has occurred and the system generates an incident report. In some embodiments, help desk personnel receive the incident report for further action.

In an IT environment, a change is any modification of the IT environment. Changes include, but are not limited to, an update or an upgrade to an application or operating system, password changes, modification of system parameters, adding a new server, and the like. Changes potentially affect multiple users of that application or operating system. In many cases, changes are scheduled in advance to alert users of the update to follow. Whenever a change is executed, the IT environment often generates a change report detailing the change. Examples of changes includes adding a new feature, increasing memory size for a given process, removing temporary files at an increased rate, and moving data blocks around in memory. Whenever a change occurs, a change report is generated. In some examples, a change can cause unintended consequences, such as further incidents.

Root cause analysis is an analytical method used to solve problems by identifying the root causes of defects, problems, and faults as defined by incident reports. Root cause analysis is commonly used in information technology (IT) operations, accident analysis, computer applications, and the like.

Change failure probability is a value quantifying how often failures occur in a process that requires an immediate remedy. Change failure probability is used to define the probability of success or failure for a given change request.

Mitigation of a problem is defined as reducing the severity, consequences, or seriousness of a problem. Problem mitigation can be addressed in one of four ways. First, depending on the severity of the consequences, a problem can be ignored. Second, a response to an incident can be delayed for a period of time until a more optimal situation is on hand to deal with the problem. Third, problem mitigation can include remedial actions to counteract the effects of the problem. Finally, problem mitigation includes taking action to avoid potential future problems by avoiding situations and operating conditions that triggered previous problems or incidents in the past.

In an IT environment, incidents can occur during operations or after change events. Incidents can often cause delays, server crashes, application failures, and the like. Particular parameters related to the incident, such as a timestamp, threads currently active, processes being executed, and the like, are considered dimensions of the incident, or incident dimensions. The incident dimensions aid in defining the incident in parameters to be used in a causal analysis to define possible root causes and eventual mitigation efforts to minimize the incident for a future occurrence.

A Galois connection is used in mathematical and statistical order theory to describe a correspondence between two partially-ordered sets of data. Galois connections generalize the correspondence between two subgroups. A monotonic Galois connection involves special cases of pairs of functions belonging to the two sets of data, and expresses connections between the two sets of data that is invertible (elements of the first set can correspond to elements of the second set and vice versa in a unique correspondence relationship).

SUMMARY

The illustrative embodiments provide a method of identifying an incident root cause probability that includes identifying, using a monitoring system, a first incident/incident class and generating, using a change management application, a first change request and change class. The method also includes generating, from the change management application, a second change request from a second incident, and where the first and second incidents are in a set of incidents, and where the first and second change requests are in a set of changes, mapping, by a cause analysis application, the set of incidents to the set of changes to identify a root cause probability, where the probability is formed by from a Galois linkage chain between the two sets, and developing, from the cause analysis application, a root cause probability value of the first incident, and executing, using a parameter management application, a mitigation process.

An embodiment includes a computer usable program product for identifying a root cause and effect probability of an incident in an information technology environment (IT environment), made of one or more computer readable storage media and program instructions collectively stored on the one or more computer readable storage media, the program instructions including program instructions to identify, through the operation of a monitoring system in a data processing system in the IT environment, responsive to a first incident, a first incident class from a first parameter of the first incident, where an incident is an interruption to a service operation in the IT environment, program instructions to generate, through the execution of a change management application operating in conjunction with the monitoring system, responsive to identifying the first incident class, a first change request, where the first change request identifies an associated change class, and program instructions to generate, from the change management application, responsive to the identifying of the change class, a second change request from a second parameter of a second incident, where the second change request is associated with the change class, and where the first incident and the second incident are members of a set of incidents, and where the first change request and the second change request are members of a set of changes. The program instructions also include program instructions to map, through the execution of a cause analysis application working in conjunction with the monitoring system, the set of incidents to the set of changes to identify a root cause and effect probability link, where the probability link is formed by developing a monotonic Galois linkage chain between the set of incidents and the set of changes, and where the linkage chain is based on a subset of a set of parameters comprising temporal similarity, explicit mentions, influence analysis, a configuration item map, a structured field similarity, an unstructured field similarity, and a problem class reference, program instructions to develop, from the cause analysis application, a root cause probability value of the first incident, and program instructions to execute, through the operation of a parameter management application in the data processing system in the IT environment, a mitigation process based on the root cause probability value.

An embodiment includes a computer system that includes one or more processors, one or more computer-readable memories, and one or more computer-readable storage devices, made of a server, a monitoring system, a change management application, a cause analysis application, and a parameter management application. The computer system also includes program instructions to identify, through the operation of a monitoring system in a data processing system in the IT environment, responsive to a first incident, a first incident class from a first parameter of the first incident, where an incident is an interruption to a service operation in the IT environment, program instructions to generate, through the execution of a change management application operating in conjunction with the monitoring system, responsive to identifying the first incident class, a first change request, where the first change request identifies an associated change class, and program instructions to generate, from the change management application, responsive to the identifying of the change class, a second change request from a second parameter of a second incident, where the second change request is associated with the change class, and where the first incident and the second incident are members of a set of incidents, and where the first change request and the second change request are members of a set of changes. The computer system also includes program instructions to map, through the execution of a cause analysis application working in conjunction with the monitoring system, the set of incidents to the set of changes to identify a root cause and effect probability link, where the probability link is formed by developing a monotonic Galois linkage chain between the set of incidents and the set of changes, and where the linkage chain is based on a subset of a set of parameters comprising temporal similarity, explicit mentions, influence analysis, a configuration item map, a structured field similarity, an unstructured field similarity, and a problem class reference, program instructions to develop, from the cause analysis application, a root cause probability value of the first incident, and program instructions to execute, through the operation of a parameter management application in the data processing system in the IT environment, a mitigation process based on the root cause probability value.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a method structure showing the input, output, and application of a root cause analysis in accordance with an illustrative embodiment;

DETAILED DESCRIPTION

Figure 1:
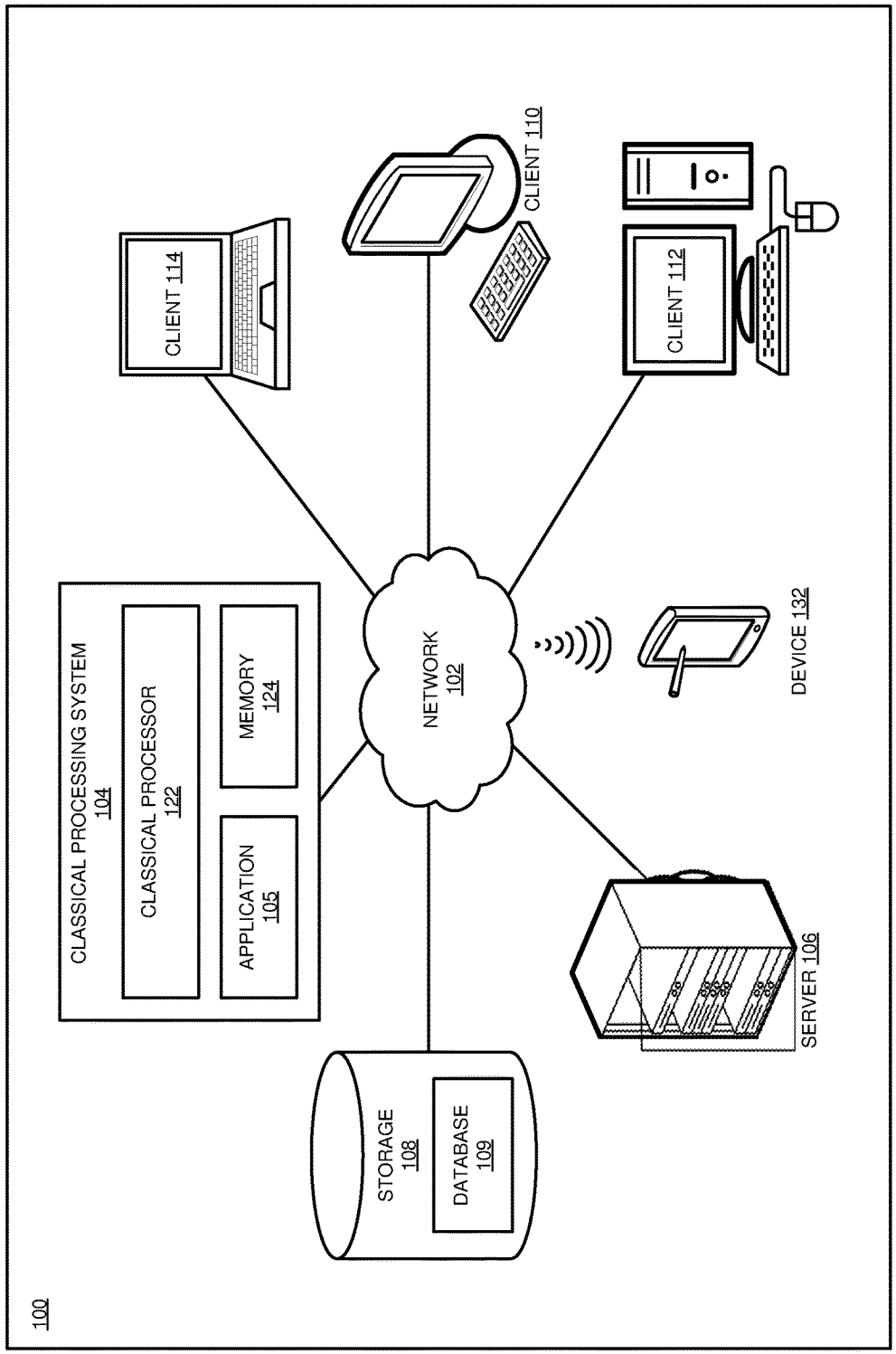
FIG. 1 depicts a block diagram of a network of data processing systems in which illustrative embodiments may be implemented.

The illustrated embodiments recognize that there is a need to identify the root cause of an incident using an application operating in a data processing system and to mitigate the effects of that incident in an IT environment. Furthermore, there is a need to improve root cause analysis and enable proactive problem mitigation by developing cause and effect linkage chains by an application operating in a data processing system from incidents to changes, and from changes to incidents. Once established, linkage chains are usable for improving identity of incidents and problems hindering operation of a server in an IT environment. As disclosed herein, an application operating within a data processing system creates improved incident root cause analysis results with faster execution times and less error. The application operating in a data processing system also results in in improved root cause identification rates as well as a reduction in the change failure probability over performing a root cause analysis offline or manually. The illustrated embodiments disclosed herein perform a root cause analysis through identifying the root cause of incidents based on connected historical incidents through a Galois connection method.

The illustrative embodiments recognize that the presently available tools or solutions do not address these needs or provide adequate solutions for these needs. The illustrative embodiments used to describe the invention generally address and solve the above-described problems and other problems related to identifying the root cause probability value of incidents and changes, and identifying linkage chains between sets of incidents and sets of changes.

An embodiment can be implemented as a software application. The application implementing an embodiment can be configured as a modification of an existing analysis system, as a separate application that operates in conjunction with an existing analysis system, a standalone application, or some combination thereof. Particularly, some illustrative embodiments provide a method of identifying an incident root cause probability using a monotonic Galois linkage chain between a set of incidents and a set of changes. Furthermore, a parameter management application executes a mitigation process based on the root cause probability.

The illustrative embodiments provide a method of identifying an incident root cause probability that includes identifying, using a monitoring system, a first incident/incident class and generating, using a change management application, a first change request and change class. The method also includes generating, from the change management application, a second change request from a second incident, and where the first and second incidents are in a set of incidents, and where the first and second change requests are in a set of changes, mapping, by a cause analysis application, the set of incidents to the set of changes to identify a root cause probability, where the probability is formed by from a Galois linkage chain between the two sets, and developing, from the cause analysis application, a root cause probability value of the first incident, and executing, using a parameter management application, a mitigation process.

The manner of identifying a root cause probability of incidents based on a monotonic Galois linkage chain, and executing a mitigation process based on the probability is unavailable in the presently available methods in the technological field of endeavor pertaining to root cause analysis in an IT environment. A method of an embodiment described herein, when implemented to execute on a device or data processing system, comprises substantial advancement of the functionality of that device or data processing system in identifying a root cause probability of incidents and executing a mitigation process based on that probability.

The illustrative embodiments are described with respect to certain types of appliances, data sets, functions, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

According to some embodiments, root cause analysis involves four operations, including identifying the problem, determining a timeline of incident events, determining contributing factors that lead to likely root causes of the problem, and establishing causality between the likely root cause and the incident. Once the application, executes a root cause analysis, a parameters management application module executes mitigation measures.

The illustrative embodiments recognize that there is a need to improve incident root cause analysis based on the application of monotonic Galois connections and extended incident analysis, problem analysis, and change class analysis. The embodiments disclosed enable proactive problem mitigation by developing a monotonic Galois cause and effect linkage chains from changes to incidents, as well as from incidents to changes. Linkage chains are then used for early identification of root causes and also to drive a parameter management module which proposes proactive mitigations.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
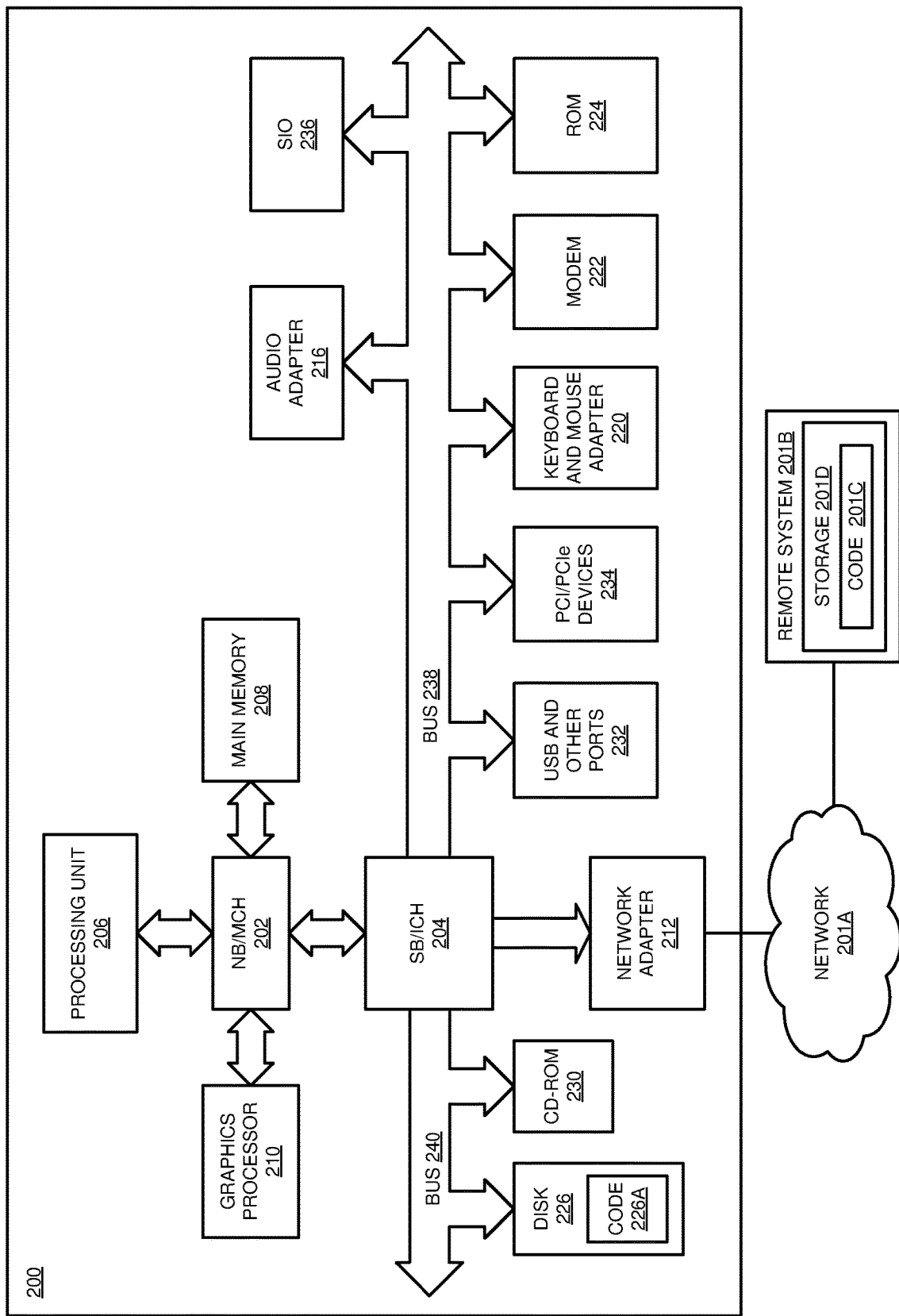
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as classical processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

FIG. 3 depicts a method structure 300 illustrating the input (x), output (y), and application listing of a root cause analysis in accordance with an illustrative embodiment. FIG. 3 illustrates two input (x) incident reports (incidents or incident events) field 302 labeled as incidents INC123 and INC236. Together, incident events field 302 INC123 and INC 236 are members of a set of incidents and are used later in the root cause analysis process as described herein. The method structure 300 includes an output report field 304 labeled "root cause of the incident" and refers to the latest incident (INC236) and the root cause of that incident. Next, the method structure 300 includes an application field 306 labeled as "based on root cause analysis; seek to reduce the number of future incidents" and describes how the output report field 304 is being used; in this example, the root cause analysis is used to reduce the number of future incidents.

In operation, a user wants to know the inputs and outputs, such as incident event field 302 and output report field 304, respectfully. According to some embodiments, the inputs are incident reports while the output is a root cause of the latest incident. The root cause analysis is performed in order to predict, or determine a probability of, future behavior of incidents, including the likelihood of a future incident and the possible risks associated with a future incident.

To begin the root cause analysis, first the inputs must be determined, and then a link between multiple incidents, arrayed in a set of incidents, must be established. The example below will use the following definitions:

Let INC be a set of incidents for a chosen account;
Let CHG be a set of changes for the same account;eb;
  normal A pair of mappings is considered:
  $\varphi$: INC→$\mathcal{P}$(CHG) from the set of INC to the set of subsets of CHG;
  $\psi$: CHG→$\mathcal{P}$(INC) from the set of CHG to the set of subsets of INC;
  where $\varphi(i)=\{c_1, \ldots, c_n\}$ if and only if incident i caused change $c_j$, where j=1, ..., n and i in INC or, similarly, change $c_j$ is an implication of incident i.

By causing the output change (by generating a change report), it is inferred that there is a link between incident i and change c such that there is a high probability that i caused $c_3$. This probability is shown as:

$$\varphi(i)\sim cj \text{ if } cj \text{ is in } \{c_1, \ldots, c_n\}.$$

Dimensions (parameters) for determining this link probability are described as follows:

Temporal Similarity—whether the incident and change are within a reasonable temporal order, which are assumed to be correct e.g., if $\varphi(i)\sim cj$, then the start time of cj is after the start time of i.

Explicit Mentions—whether the change text explicitly mentions the incident, e.g., explicit mention of incident number xyz (e.g., INC1234) in the change text.

Influence Analysis—this is based on a collected technical knowledgebase where a cause management application is able to estimate the probability that the incident influenced the area of change, e.g., in the knowledgebase, there is a reference that an internet protocol (IP) allocation incidents are causing firmware (FW) update changes.

Configuration Item (CI) Map—The CI map is a set of links between CI's in the client's infrastructure which shows a CI connection structure, e.g., it can look like a graph where the application server is connected or linked to its database server. This dimension quantifies whether the change and incident are observed on the same CI, e.g., server ABC. If the answer is "no", was the same CI associated with the incidents and changes observed on a CI which is connected with the root CI by the account CI map?

Structured Field Similarity—this is whether an incident has any structured fields in common with a change, e.g., the same owner resolver group or the same classification. When comparing an incident ticket structured fields against the change structured fields, the results can show exact or partial matches.

Unstructured/Derived Field Similarity—this is whether an incident has any common entities and/or actions with a change. When comparing an incident resolution plan and a change abstract, description, or resolution to identify exact or partial phrases.

Problem Class Reference—in order to identify the correct incident-to-change link, the associated problem ticket is analyzed. There is a high probability that the reference to the appropriate change is identified by the problem management process as described in the problem ticket.

Figure 4:
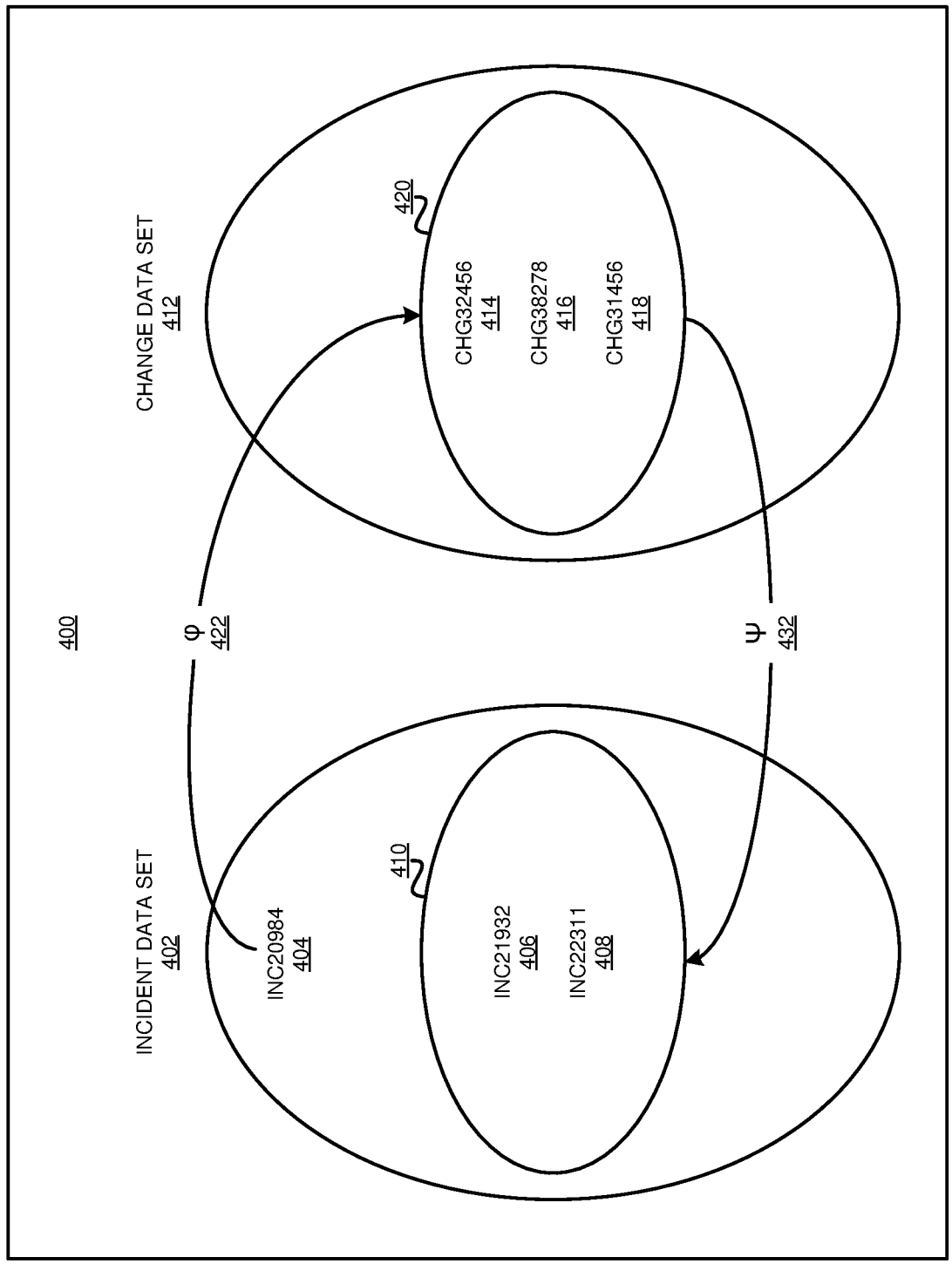
FIG. 4 depicts a graphical diagram of linkages between an incident data set with a change data set in accordance with an illustrative embodiment.

FIG. 4 depicts a graphical diagram 400 of linkages between an incident data set (INC) 402 with a change data set (CHG) 412 in accordance with an illustrative embodiment. The incidents data set 402 includes a number of example incident events such as INC20984 404, INC21932 406, and INC22311 408. Change data set 412 includes example change reports CHG32456 414, CHG38278 416, and CHG31456 418. Also disclose in FIG. 4 are linkages between the incident data set 402 and the change data set 412, including an incident-to-change linkage (q) 422 and a change-to-incident linkage (w) 432. Incident event 404 is linked to change reports 414, 416, and 418 via linkage 422, while change reports 414, 416, and 418 are members of a change data subset 420 linked via linkage 432 to incident events 406 and 408, which are members of an incident data subset 410. Meanwhile, incident event 404 is not a member of a subset. As illustrated in FIG. 4, incidents 402 can be linked via linkage 422 to changes 412, and changes 412 can be linked via linkage 432 to incidents 402.

In operation, in order to apply these concepts to incident and change analysis we consider following sets:

For incident i of the incident data set 402, we consider
$i \cup \psi(\varphi(i))$ 422; and For change c of the changes data set 412, we consider
$c \cup \varphi(\psi(c))$ 432;

As disclosed herein, a pair of mappings involving incident data set 402 and changes data set 412 form a monotonic Galois connection between sets INC 402 and CHG 412, so, if the incident i is considered, then $\psi(\varphi(i))$ 432 forms a new subset of incidents 410 which are connected to incident i by some subset 420 of set CHG 412. Thus, considering $\psi(\varphi(i))$ 432 instead of just i, the incident analysis is wider in terms of understanding cause and effect of actions taken by technical teams in a chain. Through the use of natural language processing of the narrative of i and $\psi(\varphi(i))$ 432, new patterns can be found and recommendations how to avoid incidents caused by previous incidents can be made.

As an example, FIG. 4 includes the following incidents 402 and changes 412:

Incident Report #1:
INC20984 404 for one account was logged into the system;
Description of Incident:
Please allocate production IP address in the client subnet (ip address reference).
Incident Report #2:
INC20984 404→CHG32456 414
Description of Incident:
The incident was analyzed by technical teams and change request CHG32456 414 was created in order to fulfill appropriate technical actions on DHCP server.
Change Report #1:
CHG32456 414
Description of the Change:
Location address reference
Soft Change request:
Allocation of production IP address in the client subnet (ip address reference).
ITSCM team need client production IP address allocated in order to fulfil client Disaster Recovery test requirement.
Change Report #1 is the change based on INC20984 404.
Incident Report #3:
INC1932 406
Description of Incident:
IP does not communicate with gateway.
The Incident #3 description field is quite extensive, but includes an allocated production IP: (ip address reference) and discloses a change number which forms a link between the change and incident.
After the change implementation, the IP address which was allocated was not working properly. This was a cause of a new incident, INC21932 406. Thus, the logic chain is:
INC20984 404→CHG32456 414→INC21932 406.

Continuing with the example above, the root cause was that, in the gateway, there was no specific security rule implemented for allocating IP addresses, so even if the IP was allocated, it still required a change window to change security rules in the gateway. By analyzing INC20984 404, then $\varphi$ (INC20984 404)=CHG32456 414, and finally $\psi$ (CHG32456 414)=INC21932 406, a connection was made: {INC20984 404, INC21932 406}. By applying natural language analysis and context analysis, a change request (recommendation) is made to allow for security tag updates in the gateway during IP address allocation. The change request is not for incidents like INC21932 406 where the problem is already noticed, but for incident INC20984 404 where allocation is requested. In terms of time saving, there was some relevant time spent from the first incident logged into the system until the final resolution, which can be avoided by placing the change request into place for the first incident to be executed during a scheduled security gateway tag update.

Figure 5:
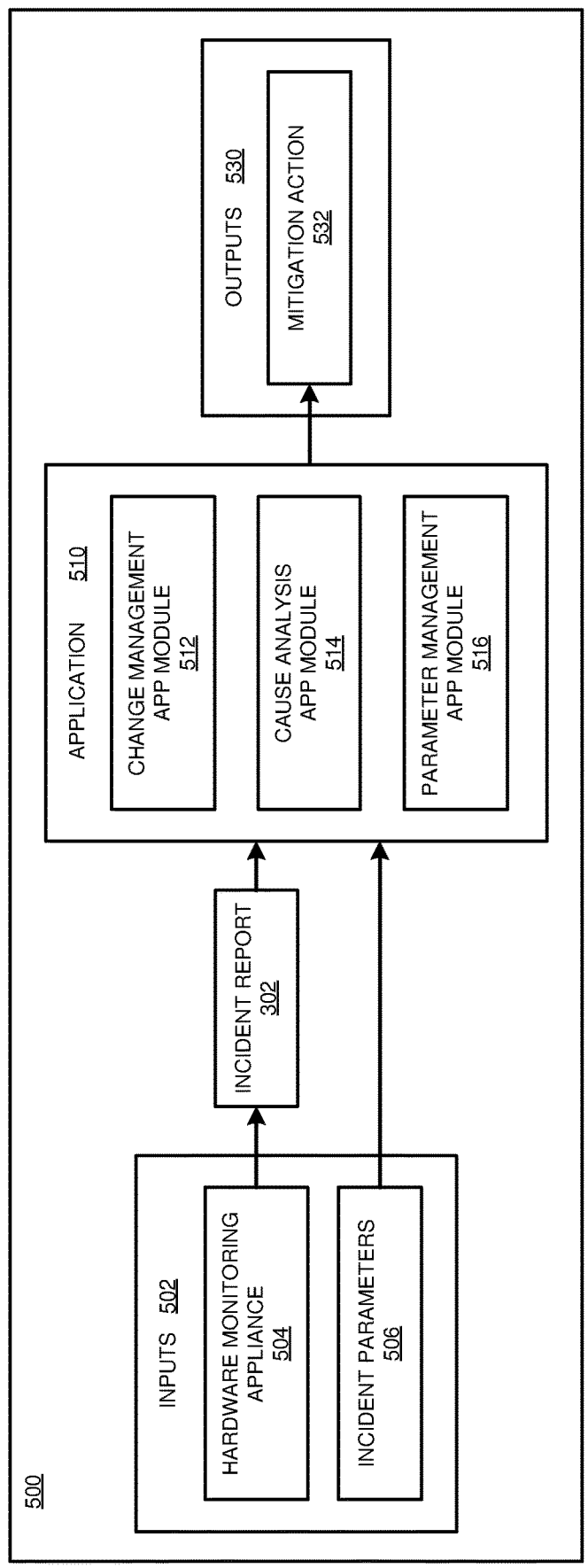
FIG. 5 depicts a block diagram of an example application that runs on a server for determining a root cause probability value of incidents in accordance with an illustrative embodiment.

FIG. 5 depicts a block diagram 500 of an example application 510 that runs on a server, such as server 106 of FIG. 1 for determining a root cause probability value of incidents in accordance with an illustrative embodiment. Block diagram 500 discloses inputs 502 which include incident reports (incidents) 302 and a monitoring system 508. The monitoring system 504 is a device, application, process, agent, or service for providing oversight, management, and monitoring of the processes, threads, and performance of elements of the data processing environment 100 of FIG. 1. According to some embodiments, the monitoring system 504 generates an incident report 302 whenever a hardware device or software application experiences an unwanted event during operations. The monitoring system 504 then sends the incident report 302 to the application 510 for further (root cause) analysis as described herein.

Application 510, running on the data processing environment 100, includes a number of processes or modules, including but not limited to a change management application module 512, a cause analysis application module 514, and a parameter management application module 516. The change management application module 512 accepts as an input the incident report 302 from the monitoring system 504. From this input, the change management application module 512 analyzes the parameters of the incident report 302 and identifies an incident class associated with that incident report 302. According to some embodiments, identifying a first incident class includes at least one of executing a natural language analysis, a context analysis, an incident analysis, a problem analysis, a change class analysis, and an area analysis. In addition, the change management application module 512 generates a change request, such as change request 414 of FIG. 4, detailing the recommended changes to system parameters to avoid further incidents in the future. From the change request, the change management application module 512 also assigns the change request an associated change class value.

The cause analysis application module 514 accepts as inputs the incident report 302 (from the monitoring system 504), the incident class, the change request 414, and the change class and analyzes the input data to map the set of incidents 302 to the set of change reports, and also to map the set of change reports back to the set of incidents 302. The cause analysis application module 514 operates to identify a root cause and effect probability link, such as linkages 422 and 432 of FIG. 4 between sets of incidents and sets of changes through the use of monotonic Galois linkage chains as described herein. The linkage chain is based on a subset of a set of parameters that include at least one of a temporal similarity, explicit mentions, influence analysis, a configuration item map, a structured field similarity, an unstructured field similarity, and a problem class reference as disclosed herein.

In operation, the cause analysis application module 514 works as follows:

The monotonic Galois connection is based on a temporal relation, where the temporal relation≤in the set INC and CHG, respectively, are defined in the following way:
$i_1 \le i_2$ if and only if the start time of $i_1$ is earlier or equal than $i_2$ for $i_1$, $i_2$ in INC;
$c_1 \le c_2$ if and only if start time of $c_1$ is earlier or equal than $c_2$ for $c_1$, $c_2$ in CHG;
$\varphi(i) \le c$ represents a temporal relation≤between any element of $\varphi(i)$ and c;
In the other direction, $\psi(c) \le i$ represents a temporal relation≤between any element of $\psi(c)$ and i.
Thus, for all i in INC, $i \le \psi(\varphi(i))$. This is because incident i caused $\psi(i)=\{c_1, \ldots, c_j\}$, so i is earlier than $c_1, \ldots, c_j$. Then $\psi(c_n)=\{i_1, \ldots i_k\}$ are caused by $c_n$, meaning that they are later in time than $c_n$. Therefore, they are later then i.
Moreover, $c \le \varphi(\psi(c))$. This is because $\psi(c)=\{i_1, \ldots i_k\}$ and $i_j$ are later then c. Then $\varphi(i_j)=\{c_1, \ldots, c_s\}$, and $c_1$ are later then $i_j$. Therefore, they are later then c.

The results are that the pair of mappings $(\varphi, \psi)$ forms a Galois connection between set INC and set of CHG. In order to make this approach more widely applicable, multiple iterations of this logic can be executed in one direction, as well as executed into the reverse direction. From that perspective, the cause analysis application 514 is seeking to determine Galois pairs, not only by moving from the Incidents to Changes and in the reverse direction, but also by executing the analysis multiple times as long as the new ticket linkage is discovered by the system.

As an example, in order to apply this concept to incident and change analysis, consider following sets:
for incident i we consider $i \cup \psi(\varphi(i))$;
for change c we consider $c \cup \varphi(\psi(c))$;
for extended analysis additional sets can be created for automated analysis;
for example $i \cup \psi(\varphi(i)) \cup \psi(\varphi(\psi(\varphi(i))))$ or $c \cup \varphi(\psi(c)) \cup \varphi(\psi(\varphi(\psi(c))))$.
As shown above, a pair of mappings form a monotonic Galois connection between sets INC and CHG. Therefore, if the incident i is considered, then $\psi(\varphi(i))$ is a new set of incidents which are connected to incident i by some subset of set CHG.
Thus, considering $\psi(\varphi(i))$ instead of just i, the incident analysis is much wider in terms of understanding the cause and effect of actions taken by users in a chain. Through the use of natural language processing of the narrative of i and $\psi(\varphi(i))$, new patterns can be found and new recommendations generated to avoid future incidents caused by previous incidents.
Similar logic can be applied to c and $\varphi(\psi(c))$, where a wider set of changes caused by change c though incidents from INC may be considered.

FIG. 5 continues with the parameter management application module 516, which receives the output of the cause analysis application module 514 to generate one or more mitigation processes to minimize the consequences of future incidents based on the root cause probability value. The parameter management application module 516 generates management commands to be sent throughout the data processing environment 100 as appropriate to minimize or mitigate the effects of potential future incident events. Block diagram 500 also includes an output 530 generated by the parameters management application module 516. According to some embodiments, the output 530 includes instructions to modify system parameters 532 as disclosed herein.

Figure 6:
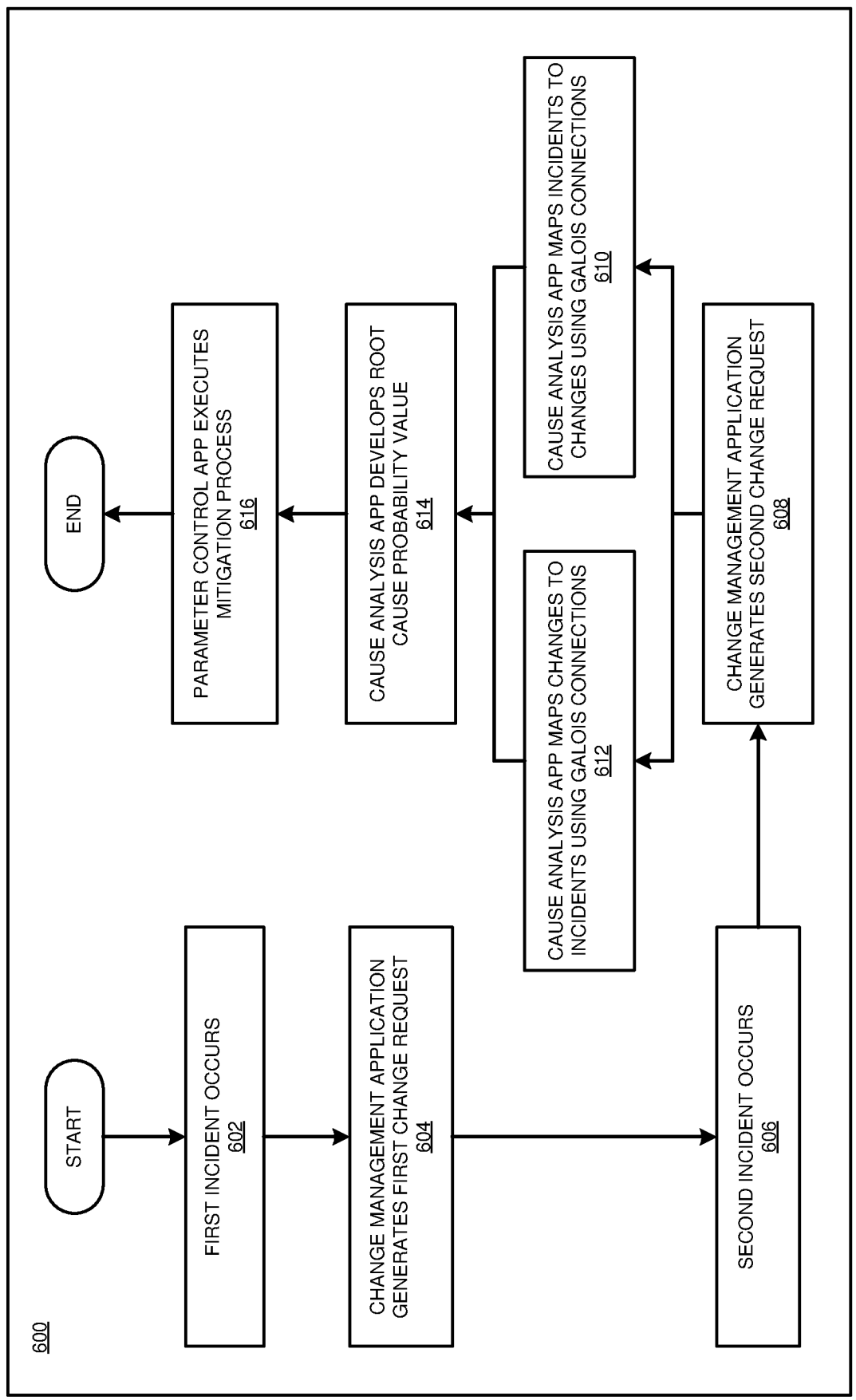
FIG. 6 depicts a flowchart of an example process for determining the root cause probability value of incidents in accordance with an illustrative embodiment.

FIG. 6 depicts a flowchart of an example process 600 for determining the root cause probability value of incidents in accordance with an illustrative embodiment. Process 600 begins at block 602 where a first incident 404 occurs. As described herein, the monitoring system 504 detects the incident and generates an incident report. Next, at block 604, the change management application module 512 generates a first change request 414 based on the first incident report and the parameters associated with the first incident report. Next, at block 606, a second incident 406 occurs. The monitoring system 504 detects the incident 406 and generates a second change request 416 at block 608. Next, the process 600 continues in one of two ways. At block 610, the cause analysis application module 514 maps the set of incidents 402 to the set of changes 412 using the linkage 422. Alternately, the process 600 continues at block 612, the cause analysis application module 514 maps the set of changes 412 to the set of incidents 402 using a linkage 432.

Continuing with FIG. 6, the process flow then continues to block 614, where the cause analysis application module 514 develops a root cause probability value based on the set of incidents 402, the parameters associated with the set of incidents 402, the set of changes 412, and the linkages 422, 432 associated with the two sets 402, 412. Finally, at block 616, the process concludes with the parameter management application module 516 generates and executes a mitigation action 532 in an effort to both prevent future incidents and to limit the consequences of past incidents.

Thus, a computer implemented method, system or apparatus, and computer program product are provided in the illustrative embodiments for incident root cause analysis using Galois connections and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying a root cause and effect probability of an incident in an information technology environment (IT environment), comprising:
    identifying, by a monitoring system in a data processing system in the IT environment, responsive to a first incident, a first incident class from a first parameter of the first incident, wherein an incident is an interruption to a service operation in the IT environment;
    generating, by a change management application of the data processing system operating in conjunction with the monitoring system, responsive to identifying the first incident class, a first change request, wherein the first change request identifies an associated change class;
    generating, by the change management application of the data processing system, responsive to the identifying of the change class, a second change request from a second parameter of a second incident, wherein the second change request is associated with the change class, and wherein the first incident and the second incident are members of a set of incidents, and wherein the first change request and the second change request are members of a set of changes;

mapping, by a cause analysis application of the data processing system working in conjunction with the monitoring system, the set of incidents to the set of changes to identify a root cause and effect probability link, wherein the probability link is formed by developing a monotonic Galois linkage chain between the set of incidents and the set of changes, and wherein the linkage chain is based on a subset of a set of parameters comprising temporal similarity, explicit mentions, influence analysis, a configuration item map, a structured field similarity, an unstructured field similarity, and a problem class reference;

developing, by the cause analysis application of the data processing system, a root cause probability value of the first incident; and executing, by of a parameter management application in the data processing system in the IT environment, a mitigation process based on the root cause probability value.

2. The method of claim 1, wherein identifying a first incident class is comprised of executing a subset of a set comprising a natural language analysis and a context analysis.

3. The method of claim 1, wherein identifying a first incident class is comprised of executing a subset of a set comprising an incident analysis, a problem analysis, and a change class analysis.

4. The method of claim 1, wherein identifying a first incident class is comprised of executing an area analysis.

5. The method of claim 1, wherein the influence analysis is based on a technical knowledgebase to estimate a probability that the change request influences an area of incident value and a machine learning component.

6. The method of claim 1, further comprising mapping, by the cause analysis application of the data processing system working in conjunction with the monitoring system, the set of changes to the set of incidents to identify the root cause and effect probability link.

7. A computer usable program product for identifying a root cause and effect probability of an incident in an information technology environment (IT environment), comprising one or more computer readable storage media and program instructions collectively stored on the one or more computer readable storage media, the program instructions comprising:

program instructions to identify, by a monitoring system in a data processing system in the IT environment, responsive to a first incident, a first incident class from a first parameter of the first incident, wherein an incident is an interruption to a service operation in the IT environment;

program instructions to generate, by a change management application of the data processing system operating in conjunction with the monitoring system, responsive to identifying the first incident class, a first change request, wherein the first change request identifies an associated change class;

program instructions to generate, by the change management application of the data processing system, responsive to the identifying of the change class, a second change request from a second parameter of a second incident, wherein the second change request is associated with the change class, and wherein the first incident and the second incident are members of a set of incidents, and wherein the first change request and the second change request are members of a set of changes;

program instructions to map, by a cause analysis application of the data processing system working in conjunction with the monitoring system, the set of incidents to the set of changes to identify a root cause and effect probability link, wherein the probability link is formed by developing a monotonic Galois linkage chain between the set of incidents and the set of changes, and wherein the linkage chain is based on a subset of a set of parameters comprising temporal similarity, explicit mentions, influence analysis, a configuration item map, a structured field similarity, an unstructured field similarity, and a problem class reference;

program instructions to develop, by the cause analysis application of the data processing system, a root cause probability value of the first incident; and program instructions to execute, by a parameter management application in the data processing system in the IT environment, a mitigation process based on the root cause probability value.

8. The computer usable program product of claim 7, wherein program instructions to identify a first incident class is comprised of executing a subset of a set comprising a natural language analysis and a context analysis.

9. The computer usable program product of claim 7, wherein program instructions to identify a first incident class is comprised of executing a subset of a set comprising an incident analysis, a problem analysis, and a change class analysis.

10. The computer usable program product of claim 7, wherein program instructions to identify a first incident class is comprised of executing an area analysis.

11. The computer usable program product of claim 7, wherein the influence analysis is based on a technical knowledgebase to estimate a probability that the change request influences an area of incident value and a machine learning component.

12. The computer usable program product of claim 7, further comprising program instructions to map, by the cause analysis application of the data processing system working in conjunction with the monitoring system, the set of changes to the set of incidents to identify the root cause and effect probability link.

13. The computer usable program product of claim 7, wherein the stored program instructions is computer usable code stored in a computer-readable storage device in a data processing system, and wherein the stored program instructions are transferred over the network from a remote data processing system.

14. The computer usable program product of claim 7, wherein the stored program instructions is computer usable code stored in a computer readable storage device in a server data processing system, and wherein the computer usable code is downloaded over the network to a remote data processing system for use in a computer readable storage device associated with the remote data processing system.

15. A computer system, comprising:

one or more processors, one or more computer-readable memories, and one or more computer-readable storage devices, comprising:

a server;
a monitoring system;
a change management application;
a cause analysis application;
a parameter management application; and
program instructions to identify, by a monitoring system in a data processing system in the IT environment, responsive to a first incident, a first incident class from a first parameter of the first incident, wherein an incident is an interruption to a service operation in the IT environment;
program instructions to generate, by a change management application of the data processing system operating in conjunction with the monitoring system, responsive to identifying the first incident class, a first change request, wherein the first change request identifies an associated change class;
program instructions to generate, by the change management application of the data processing system, responsive to the identifying of the change class, a second change request from a second parameter of a second incident, wherein the second change request is associated with the change class, and wherein the first incident and the second incident are members of a set of incidents, and wherein the first change request and the second change request are members of a set of changes;
program instructions to map, by a cause analysis application of the data processing system working in conjunction with the monitoring system, the set of incidents to the set of changes to identify a root cause and effect probability link,
wherein the probability link is formed by developing a monotonic Galois linkage chain between the set of incidents and the set of changes, and
wherein the linkage chain is based on a subset of a set of parameters comprising temporal similarity, explicit mentions, influence analysis, a configuration item map, a structured field similarity, an unstructured field similarity, and a problem class reference;
program instructions to develop, from the cause analysis application of the data processing system, a root cause probability value of the first incident; and
program instructions to execute, by a parameter management application in the data processing system in the IT environment, a mitigation process based on the root cause probability value.

16. The computer system of claim 15, wherein program instructions to identify a first incident class is comprised of executing a subset of a set comprising a natural language analysis and a context analysis.

17. The computer system of claim 15, wherein program instructions to identify a first incident class is comprised of executing a subset of a set comprising an incident analysis, a problem analysis, and a change class analysis.

18. The computer system of claim 15, wherein program instructions to identify a first incident class is comprised of executing an area analysis.

19. The computer system of claim 15, wherein the influence analysis is based on a technical knowledgebase to estimate a probability that the change request influences an area of incident value and a machine learning component.

20. The computer system of claim 15, further comprising program instructions to map, by the cause analysis application of the data processing system working in conjunction with the monitoring system, the set of changes to the set of incidents to identify the root cause and effect probability link.

* * * * *